United States Patent Office 2,959,113
Patented Nov. 8, 1960

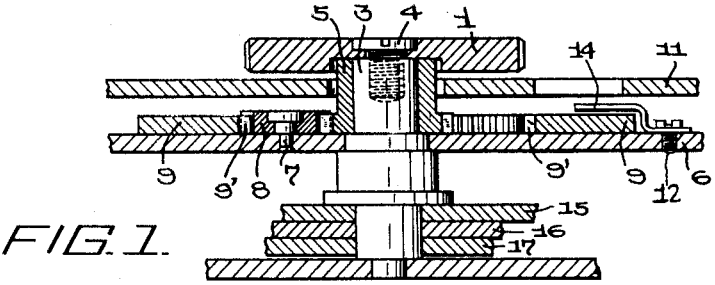
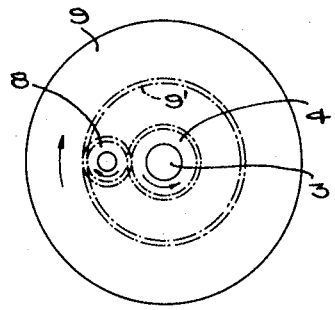
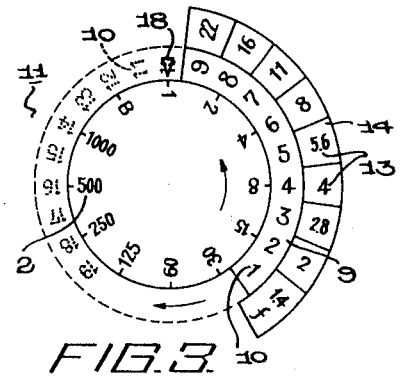
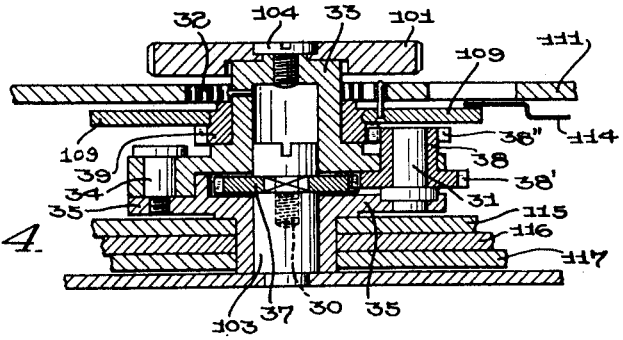
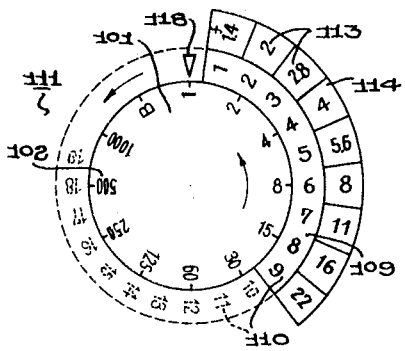
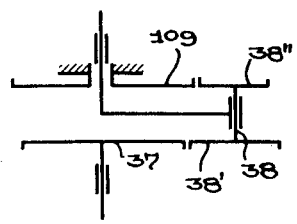

2,959,113

APPARATUS FOR COORDINATING CAMERA SHUTTER SPEED, IRIS OPENING AND LIGHT VALUE

Yoshizo Tashima, Nishinomiya City, and Masao Sugiyama, Ashiya City, Japan, assignors to Chiyoda Kogaku Seiko Kabushiki Kaisha, Osaka City, Japan, a corporation of Japan Filed Mar. 26, 1957, Ser. No. 648,570

Claims priority, application Japan Mar. 28, 1956

3 Claims. (Cl. 95—64)

The present invention relates to a gearing mechanism for determining various elements of the exposure excluding light value indices for a focal plane shutter.

Usual cameras have a high speed range of graduation for the speed of a focal plane shutter, for instance, $1/35$ second to $1/1000$ second, as well as a low speed range of graduation for the shutter speed for instance, 1 second to $1/25$ second, separately engraved on two speed dials for the focal plane shutter respectively. On the other hand they may have the whole range of said graduation, for instance, 1 second to $1/1000$ second engraved on one speed dial for the focal plane shutter, wherein the graduation is usually unevenly divided. Such an arrangement of the graduation is, of course, satisfactory, so far as adjustment of the exposure is concerned. However, in case the light value indices and/or the iris apertures are to be incorporated in such a shutter speed graduation, an accurate indication of those elements of exposure can not always be obtained, because in the practical manipulation contradictions occur in such an arrangement amidst the three graduations respectively for the speed of a focal plane shutter, light value indices and the iris apertures. Thus, the usual camera having such graduations has a defect of being unsuitable for practical use.

The present invention removes such defects which are inherent in the usual camera mechanism, and the mechanism of this invention is characterized in that each of various elements of the exposure is determined by a definite combination of the speed of focal plane shutter, light value indices and the iris apertures. This combination is constructed and arranged in such a way that a dial for the speed of a focal plane shutter has an equiaperture speed graduation engraved around the entire upper circular face of said dial and is geared with a dial for the light value indices. The latter dial is arranged coaxially in conjunction with said dial for the speed and has a graduation for the light value indices engraved thereon similarly to said speed dial for a focal plane shutter. Under any suitable fixed ratio of speed reduction, through a speed changing gear mechanism, particularly by taking advantage of the whole periphery of the speed dial for a focal plane shutter, an equiaperture graduation for the speed is engraved around the dial and a speed changing gear mechanism is provided which operates at a fixed speed reduction ratio. Accordingly, the elements of exposure satisfying all the conditions may be determined accurately and shown clearly by a remarkably simple operation; the whole mechanism can be encased in a relatively low range of height, and put together around the same axis, requiring no remarkably large space to be occupied thereby in the construction, and consequently lowering the cost of manufacture.

The present invention will now be described in greater detail referring to the accompanying drawings, of which Fig. 1 is a side view of the first embodiment in a longitudinal section of the mechanism according to the present invention;

Fig. 2 is a semi-diagrammatic plan view of the gearing mechanism in Fig. 1;

Fig. 3 is a plan view illustrating the arrangement of respective graduations for various elements of the exposure illustrated in Fig. 1;

Fig. 4 is a longitudinal sectional side view of a second embodiment of this invention;

Fig. 5 is an illustrative diagram of the gearing mechanism in Fig. 4; and

Fig. 6 is a plan view illustrating the arrangement of the respective graduations for the elements of exposure in Fig. 4.

In Fig. 1, 1 is a speed dial for a focal plane shutter having equidistant speed graduations 2 for e.g. 1 second to $1/1000$ second as in Fig. 3 engraved around the whole periphery of the upper circular face of said dial; 3 is an axle; said speed dial for the focal plane shutter may be rotatably provided at any suitable place on a camera body 11. Moreover, though not illustrated, it is well known that the speed dial has a necessary relation with the shutter actuating mechanism for a focal plane shutter encased in the camera body. The axle 3 is secured to the speed dial 1 by means of a set screw 4, and a driving gear wheel 5 is fixedly mounted on the axle 3 to rotate with said speed dial for the focal plane shutter. Said driving gear wheel 5 meshes with an intermediate gear wheel 8 secured to a supporting member 6 by means of a set screw 7. Further said intermediate gear wheel 8 engages with a dial for light value indices 9 having internally cut teeth 9′. On the upper peripheral surface of said dial 9 for light value indices, are engraved equidistant graduations 10 for light value indices, e.g. 1 to 19, said dial 9 being arranged in conjunction with the speed dial 1 for the focal plane shutter. Still further an iris graduation 13, for instance $f$ 1.4 to $f$ 22, is engraved on an iris graduation plate 14 secured to the supporting member 6 by means of a set screw 12 as shown in Fig. 1. 15, 16 and 17 are cam bodies for changing the exposure speed, and are in cooperation with the revolution of the speed dial 1 for the focal plane shutter. These cam bodies are a high speed cam 15, a synchrocam 16 and a low speed cam 17 respectively. 18 is a fixed index provided at a suitable position on the camera body 11.

The cams 15, 16 and 17 are secured concentrically with the speed dial 1 and revolved therewith. These cams cooperate with any other shutter mechanism (not illustrated) to change the shutter speed. However, as such is not important with respect to the substance of this invention, further description is omitted.

Now, the operation of the gearing mechanism according to the invention will be explained as follows: First, when the speed dial 1 for the focal plane shutter is rotated, the driving gear wheel 5 drives the intermediate gear wheel 8 in cooperation with said dial 1. Consequently the internally cut teeth 9′ are driven. Thus the dial 9 for the light-value indices, being geared with the speed dial 1 for the focal plane shutter, is rotated in a reverse direction to the speed dial. In this case, when the gear ratio of both gear wheels 5 and 9 is set as 1:2, the magnitude of the rotation of the dial 9 for light value indices will be reduced to ½ of that of the speed dial 1. Accordingly, when the speed graduations 2 of speed dial 1 is revolved by one section, from 1 second to ½ second. and fixed at the fixed index 18, the dial 9 for the light value indices is to be revolved by one section of the graduations 10. In practical use, when the desired exposure speed is to be set, the desired second of the graduation 2 of the speed dial 1 is fixed at the fixed index 18. Then the dial 9 for the light value indices arranged outside thereof being moved, the numeral of the graduations 10 will come to a fixed position opposite to the graduation 13 of the graduation plate 14 outside the dial 9. Therefore, the iris aperture value as coincident with a light value index (on the dial 9 of the light value indices) identical with that indicated by an exposure meter alone or encased in a camera is an adequate iris number. And when the iris is to be set appropriately in advance, the numerical value of the speed graduation 2 for the focal plane shutter coincident with the index 18 as attained by the movement of the speed dial 1 through the dial 9, internally cut teeth 9', intermediate gear wheel 8, and the driving gear wheel, by the numerical value of the graduations 10 of dial 9 the same as the light value index as shown then to the iris value to be set, is an adequate speed in this instance for the focal plane shutter.

In the next place, the embodiment illustrated in Fig. 4 will be explained, using similar numerical symbols for similar parts but with 100 added thereto.

101 is a speed dial for the focal plane shutter having an equiaperture speed graduation 102, for instance, 1 second to $1/1000$ second engraved on the entire circular upper peripheral face as illustrated in Fig. 6. 103 is an axle; and said speed dial for the focal plane shutter may be provided rotatably at any suitable place on the camera body 111; and though not illustrated, it is well known that it is arranged in required relation with the actuating mechanism for the focal plane shutter as encased in the camera body. The axle 103 is secured to the speed dial 101 for the focal plane shutter by means of a set screw 104, fixing a sleeve body 33 inserted therein rotatably in cooperation with the speed dial. Said sleeve body 33 is secured to a holding member 35 by means of a set screw 34, said holding member being rotatable about the axle 103 held within the camera body. To the axle 103 is secured a fixed gear wheel 37 by means of a set screw 30. A shaft 31 is provided on a part of said holding member 35, above and below which two gear wheels 38", 38' are provided. A double gear wheel 38 constituting said two gear wheels 38", 38' in one body is mounted free on said shaft 31; the lower gear wheel 38' engaged with a stational gear wheel 37; the upper gear wheel 38" meshes with a dial 109 for light value indices having a gear wheel 39 inserted free in the sleeve body 33. On the upper peripheral face of the dial 109 for light value indices are engraved equiaperture graduations 110 for the light value indices e.g. for 1 to 19 light value indices to correspond to the divisional numerals of the equiaperture speed graduation 102 of the speed dial 101 for the focal plane shutter. The dial 109 of light value indices is arranged in connection with the speed dial 101 for the focal plane shutter. Further, a graduation plate 114 for the iris is appropriately secured on the upper portion of the apparatus, having iris graduations 113, for instance, $f\,1.4$ to $f\,22$ engraved thereon as illustrated in Fig. 6. 115, 116 and 117 are respectively cam members for changing speeds of exposure, cooperating with the rotation of the speed dial 101, through the holding member 35 to which they are fixed, that is, a high speed cam, a synchronous cam and low speed cam respectively. 118 is a fixed index provided at a suitable position on the camera body 111; 32 is a spring to prevent the backward movement from taking place when a gear wheel 38" is engaged with a gear wheel 39, connecting both dial 101 and 109.

Operation of the mechanism will now be described as follows. First, when the speed dial 101 for the focal plane shutter is rotated, the sleeve body 33 and the supporting member 35 being revolved in one body, the upper and lower gear wheels 38", 38' secured to one part of said sleeve member revolves in one body about the stational gear wheel 37 which is secured to the axle 103, while rotating themselves. Accordingly, the gear wheel 39 is driven by the upper gear wheel 38" and the dial 109 for light value indices revolves about the sleeve body 33 in the same direction as the speed dial 101 for the focal plane shutter, that is, the double gear wheel 3 becomes a planetary gear wheel. By selecting gear ratios appropriately for those four gear wheels 37, 38', 38" and 39, any suitable reduced speed ratio may be obtained. For instance, when said four gear wheels are set at 1:2, a result may be obtained similar to that in the first embodiment shown in Fig. 1.

What we claim is:

1. Apparatus for coordinating shutter speed, iris opening and light value in an ordinary camera having an interchangeable lens system and without special attachment, said apparatus comprising a fixed iris opening scale, a light value scale member, registrable with said iris opening scale, and an operating knob having thereon a shutter speed scale registrable with said light value scale member, in combination with a gear fixed to said operating knob and rotatable therewith, an intermediate idling gear having a fixed axis meshing with said first named gear, and gear teeth on said light value scale member meshing with the teeth of said intermediate gear, whereby turning of said knob adjusts registry of the scale thereon with a fixed index on the camera body and also adjusts registry of said iris opening scale member with said light value scale.

2. Apparatus according to claim 1 wherein the gear teeth on said light value scale member are internal gear teeth to permit the three scales of the apparatus to be concentric.

3. Apparatus according to claim 2 wherein cams are connected to said operating knob for rotation thereby to change the exposure speed of the camera.

References Cited in the file of this patent

UNITED STATES PATENTS

| 2,467,946 | Rossmann et al. | Apr. 19, 1949 |
| 2,596,328 | Dorsey | May 13, 1952 |
| 2,829,574 | Gebele | Apr. 8, 1958 |

FOREIGN PATENTS

| 310,855 | Switzerland | Jan. 14, 1956 |